United States Patent [19]

Malueg

[11] 4,315,610
[45] Feb. 16, 1982

[54] OPTICAL IMAGE STABILIZING SYSTEM
[75] Inventor: Richard M. Malueg, Glendora, Calif.
[73] Assignee: McDonnell Douglas Corporation, Long Beach, Calif.
[21] Appl. No.: 930,142
[22] Filed: Aug. 2, 1978
[51] Int. Cl.³ .................... F41G 7/00; F42B 15/02; G06F 15/50
[52] U.S. Cl. .................... 244/3.16; 356/149
[58] Field of Search .................... 244/3.16; 364/453; 318/648, 649; 356/149; 73/504; 250/203 R

[56] References Cited

U.S. PATENT DOCUMENTS

| | | |
|---|---|---|
| 2,705,371 | 4/1955 | Hammond, Jr. . |
| 3,322,379 | 5/1967 | Flannelly . |
| 3,352,521 | 1/1967 | Tyler . |
| 3,406,402 | 10/1968 | Stauff et al. .................... 356/149 |
| 3,464,657 | 9/1969 | Bullard . |
| 3,582,180 | 6/1971 | Gross . |
| 3,697,848 | 10/1972 | Borjeson .................... 318/649 |
| 3,703,999 | 11/1972 | Forys et al. . |
| 3,756,686 | 9/1973 | Humphrey . |
| 3,761,714 | 9/1973 | Fernandez et al. . |
| 3,807,678 | 9/1974 | Karnopp et al. . |
| 3,856,409 | 12/1974 | Cindrich et al. . |
| 3,881,803 | 5/1975 | Parker . |
| 3,892,474 | 7/1975 | Nilsson . |
| 3,904,163 | 9/1975 | Kendy et al. . |
| 3,910,693 | 10/1975 | de la Cierva . |
| 3,951,510 | 4/1976 | Lloyd . |
| 4,014,482 | 3/1977 | Esker et al. . |
| 4,070,674 | 1/1978 | Buell et al. .................... 364/453 |
| 4,114,437 | 9/1978 | Krogmann .................... 364/453 |

FOREIGN PATENT DOCUMENTS 1333591 10/1973 United Kingdom .

Primary Examiner—Theodore M. Blum
Attorney, Agent, or Firm—Henry M. Bissell; Walter J. Jason; Donald L. Royer

[57] ABSTRACT

Apparatus for stabilizing the image of an electro-optical sensor system. The stabilizing apparatus includes a mounting structure subjected to various rotational and translational vibrations of various sorts. The mounting structure supports a platform on which the electro-optical system is mounted. The platform system comprises a platform structure isolated from the mounting structure either as a passive system, that is, one which supports the platform through a soft isolator, or as an active system, that is, one in which an actuator is mounted in parallel with the isolator in series with a bearing or flexure or other rotational decoupling. The reflective apparatus of the electro-optical system is driven by an actuator mounted on the mounting structure, i.e., in parallel with the series combination of the reflector and platform, in response to tracking signals derived from line of sight sensors mounted on the platform. This allows the shunting of reaction torques directly to the mounting structure, thereby eliminating the excitation of platform resonances.

25 Claims, 3 Drawing Figures

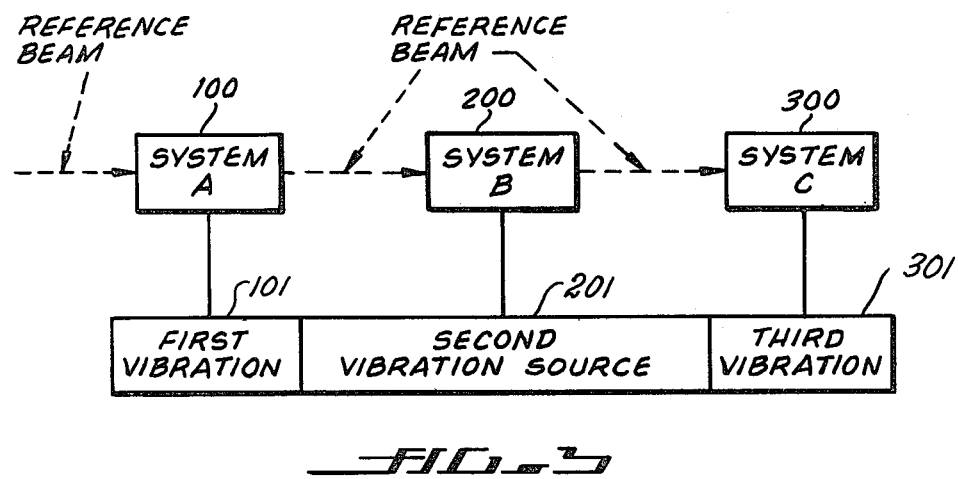

OPTICAL IMAGE STABILIZING SYSTEM

BACKGROUND OF THE INVENTION

The present invention relates generally to stabilization systems and in particular to systems for stabilizing the line of sight of image tracking sensors, usually mounted on inertial or sighting platforms, from uncontrolled and unwanted motion, such as vibrations and shocks of both translational and rotational types of motion, of the mounting structure upon which the platform is mounted. Further, this invention relates to stabilization systems which are required to perform tracking functions.

A wide variety of pointing and tracking systems for use by the military in fire control and missile applications as well as commercial applications in pointing and tracking systems is replete throughout the art as shown on the attached prior art statement. Virtually all of such systems embody some optical sensor system, either telescopic, photographic or photoelectrical in character. A serious disadvantage in these devices is the inability of prior art systems to combine stabilized optical performance in static optical systems with stabilized tracking or dynamic optical performance. Deficiencies in tracking stabilization may include target blurring due to carrier or target maneuver and generally a reduced level of resolution for the full field of view or parts thereof. Although it is possible to stabilize optical systems, or any other apparatus for that matter, over a broad range of frequencies as is disclosed in my issued U.S. Pat. No. 4,033,541 filed May 30, 1975, issued July 5, 1977, it often becomes necessary to cause rotation of elements in the optical system relative to the inertially stabilized platform upon which such systems are mounted. If the means used to effect such motion is also mounted upon the platform, the noise inherent in the sensors or electronics of such motion producing means causes the entire platform to ring or resonate at structural or other frequencies due to the noise excitation of the mechanical structure, whether such prior art optical systems are static relative to the inertially stabilized platform on which they are mounted or whether the optical systems are involved in tracking, that is, required to move relative to the platform on which they are mounted. Accordingly, it is desirable that an optical stabilization system be provided which insures stabilization of the line of sight of the sensors of the imaging system while elements thereof are moved relative to the platform upon which they are mounted as well as providing static stabilization, i.e., stabilization of the optical system when the elements thereof are compliant with the platform.

SUMMARY OF THE INVENTION

The use of soft mounted stabilizing concepts may be useful for systems that use a reflector or mirror to stabilize the line of sight, or to extend into a dome of limited size certain elements of such a system. Soft mounts decouple high frequency translational and angular motion applied to the mounting structure upon which the platform and mirror are mounted. However, in order to avoid putting reaction torques into the mounted platform when such mirrors are used to track a moving target, the mirror actuators must be arranged in a new position. This can be accomplished by putting the mirror actuators in parallel with a series combination of the translational isolator, that is, a soft mounted isolator and a bearing or flexure upon which the mirror is mounted. The advantage of this arrangement is that the mirror support structure compliance can be greater, that is, less stiff, because the support structure does not supply the mechanical ground for the mirror actuator as in conventional mirror drives. In addition, since the mirror drive is referenced to ground and not the soft mounted platform, the mirror drive mechanism does not excite the mirror support resonance or the platform resonances. Such a mechanical scheme offers a system which is much less sensitive to the resonances between the platform and the mirror assembly. This features makes lighter, less rigid structures possible, which not only results in a weight saving but increases the cost effectiveness of the system by allowing less complicated structures to be utilized. The principle set forth, namely the mirror drive whose actuator is grounded and in parallel with compliant members, may be applied to multiplatform optical benches or any other structures for that matter which are separately isolated from one another relative to an inertial reference system or to single platform systems which have inner body or non-rigid body internal resonances. In other words, several platforms, two or more, can be remote from one another; and a laser pointing system, for example, can be built such that the platforms are mechanically independent of one another, but yet stabilize the laser line of sight to either inertial space or some other tracking line of sight. By driving the mirrors relative to a target reference signal, tracking can be accomplished without exciting resonances as described before. This concept allows a tracking drive apparatus to drive mirrors or other elements of an optical system from mechanical ground, whether such mirrors or other elements are mounted on a single soft mounted platform or plurality of the same, without transmitting reaction torques through the supporting platform.

BRIEF DESCRIPTION OF THE DRAWINGS

FIG. 3 is a block diagram of a multiplatform optical stabilizing system.

DETAILED DESCRIPTION OF THE PREFERRED EMBODIMENT

Figure 1:
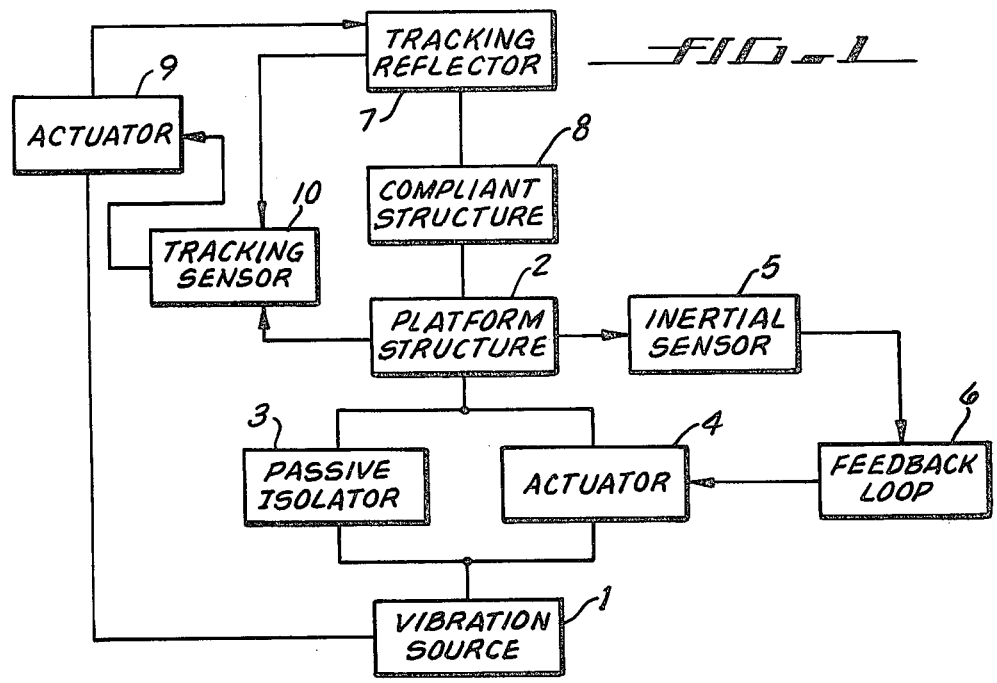
FIG. 1 is a block diagram of the optical stabilizing system.
Figure 2:
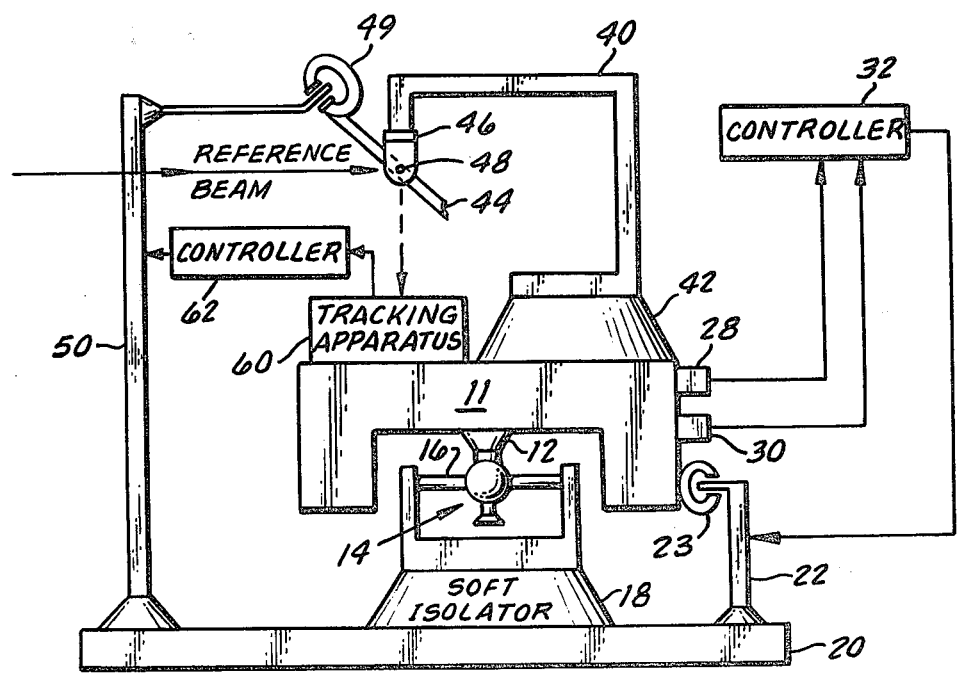
FIG. 2 is a pictorial representation of the optical stabilizing system.

With reference to the drawing, FIG. 1 is a block diagram of the new orientation of the mirror actuators in an optical system. Specifically, a vibration source 1 is shown supporting platform structure 2 through both a passive isolator 3 and an actuator 4. Inertial sensor 5 is mounted on the platform structure and activates the actuator 4 through feedback loop 6. A tracking reflector 7 is mounted on the platform structure through compliant structure 8. A second actuator 9 drives the tracking reflector 7 or other components in the optical system in response to signals from a tracking sensor 10 with respect to the vibrating source 1 directly and not the inertial platform 2 as in other systems, thereby eliminating reaction torques or forces in the compliant structure 8 or inertial platform 2. The passive isolator 3 may be a pliable or resilient isolator, such as a soft rubber member or a spring in series with a bearing, flexure or gimbal arrangement. The actuator 4 is ideally a wide gap torquing actuator as shown in FIG. 2 which has air gaps wide enough to accompany the translational as well as angular relative displacement between vibration source and platform structure. It is contemplated that a permanent magnet element having such wide air gaps as indicated before would be mounted on either the inertial platform 2 or the tracking reflector 7 while the actuator armature or platen is mounted on the vibration source in juxtaposition with said magnet. Such an inertial stabilization system may be provided with a tracking sensor 10 which senses target movement relative to the platform structure 2 and drives the actuator 9 of the reflector 7. Actuator 4 applies a control torque to the platform structure 2 in response to the signals generated by the inertial sensors 5 as applied through feedback loop 6. Actuator 9 applies a tracking control torque to the tracking reflector in response to the tracking signals generated by the tracking sensor 10. Tracking sensor 10 responds to image motion caused by relative motion between the target, the platform structure and the tracking reflector and applies corrective torques to the reflector, thereby tracking the image. It is clear in this structure that the reaction torques pass through the actuator 9 and are shunted directly to the vibration source or mechanical ground as opposed to being directed through the inertial platform itself. It should also be noted that although the inertial platform is isolated from the vibration source by both passive isolators and actuators, the platform can be isolated through any static system or combinations thereof such as a flexure, or air bearing in series or parallel with a soft isolator, or any combination of the above or indeed each such element or structure alone.

FIG. 2 is a pictorial representation of the stabilizing system described by the block diagram. Specifically, the platform 11 which corresponds to the inertial platform 2 is fixed to the rotatable part 12 of a spherical bearing assembly 14. The rotatable part 12 of the bearing 14 slides over the surface of the fixed part 16 of the spherical bearing 14 to provide three degrees of rotational motion within rather large angular limits. The bearing 40 may be an air bearing or a conventional friction bearing.

The spherical bearing assembly 14 is attached to an isolator 18, which is a soft, resilient member. The weight of the platform 11 is supported by the isolator 18 which in turn is fixed to a vehicle structure 20 which is subjected to motions of various sorts and is the source of vibration. A paddle actuator 22 having two series of windings disposed 90° to one another so as to provide motion in at least two directions is fixedly attached to the vehicle structure 20 such that the paddle portion carrying the windings is disposed between the poles of a C-shaped magnet 23 which is attached to the platform 11. A gyro 28 and an angular accelerometer 30 are fixed to the payload 11. These devices generate electrical signals in response to movement of the platform 11 relative to inertial space. The electrical output of gyro 28 and the angular accelerometer 30 are applied to a controller 32 which generates an output signal. The controller 32 signal is applied to paddle actuator 22 which causes relative motion between the paddle actuator 22 and C-shaped magnet 23, generating stabilizing torque on the platform 11. Any motion about an axis perpendicular to the plane of FIG. 2 will be sensed by both the angular accelerometer 30 and the gyro 28. By suitable calculation of the parameters of the stabilization system within the controller 32, the magnitude of motion compensating signal to be applied to the paddle actuator 22 can be mathematically determined. Any sensed rotational motion can therefore be opposed by simultaneously applying a torque to the platform 11 in a direction opposing the motion, thereby reducing to negligible levels the net torque applied to the platform 11. The gyro 28 is adequate to detect the relatively low frequency motion about the sensitive axis such as might result in changes in mounting structure 20 attitude. The gyro 28 signals these changes to the controller 32 which drives the actuator 22 to provide compensating motion to counter the rotational motion input to the platform 11. The angular accelerometer 30 is better able to sense and respond to the higher frequency motions resulting from shocks and vibrations of the mounting structure 20 that are not sufficiently attenuated by the series combination of the bearing 14 and the soft isolator 18. For further details of the operation of such a controller, the reader is referred to U.S. Pat. No. 3,703,999 to Forys et al in which is described the operation of such a controller in response to the rate gyro and an angular accelerometer in stabilizing a camera mounted in a vehicle by spring isolators and controlled actuators.

Similarly, a mirror mount 40 is supported by platform 11 through compliant structure 42. A mirror 44 is rotatably attached to said mount 40 through an azimuth bearing 46 and an elevation bearing 48. Another C-shaped magnet 49 is attached to the mirror 44 and receives the paddle portion of a second paddle actuator 50, which is similar to the paddle actuator 22 described above. Paddle actuator 50 is fixedly attached to the mounting structure 20 as was actuator 22. A tracking sensor 60 detects changes of the target reference beam or image with respect to mirror position and generates a signal which is applied to a second controller 62, like the controller 32 described above. By suitable calculation of the parameters required to null the reference beam, the magnitude of the motion compensating signal to be applied to the actuator 50 can be determined and applied.

Although the particular mirror shown may be driven over two axes, it should be readily noted that the number of axes is limited only by the number of bearings and the scope of operation of the actuator or actuators. In particular the use of at least a five axis actuator is contemplated, having three translational and two rotational axes. This structure allows reaction torques that result from motion of the mirror to be shunted directly to mechanical ground, i.e., the mounting structure 20, and not through the mirror mount 40 or the platform 11 to ground. This prevents ringing or resonance excitation of either the mirror mount, i.e., compliant structure 42, or the platform 11 due to tracking motion of the mirror in response to the tracking signal or due to electrical noise inherent in the system. It is to be understood, the controller 62 which drives actuator 50 either for tracking or stabilization and controller 32 may if desired be a single unit in which calculations for the various inputs are made and outputs are properly directed to the corresponding actuators. While only one mirror is illustrated it should also be understood that a plurality of mirrors may be mounted, either hard mounted to the vehicle structure or isolated as shown. Further, various interacting mirror elements may be mounted on a plurality of platform structures each independently stabilized. Appropriate controller logic can be added to govern interaction of the mirror elements to stabilize the line of sight which is known in the art. It should be noted that a plurality of stabilization systems as described in FIG. 2 could be devised, each interacting with the others, as shown in FIG. 3, but independently stabilized. The particular optical elements or image system may be any well known imaging system, either direct view or otherwise, and is considered within the skill of the art. As shown in FIG. 3 a reference beam is received by a system A, reference numeral 100, separately isolated from vibration source 101, which transmits said reference beam to a second separately isolated system B, 200, separately isolated from vibration source 201, which transmits to yet a third system C, 300, separately isolated from vibration source 301. The specific structure and interaction of the systems are well known in the art, except as disclosed herein.

What is claimed is:

1. A stabilizing system comprising:
   a. at least one platform supported for movement relative to mechanical ground;
   b. at least one reflector for receiving electromagnetic energy mounted on said platfrom; and
   c. means for stabilizing said reflector by reference to said mechanical ground and apart from any movement of the platform.

2. A stabilizing system as described in claim 1 further comprising: at least one mount rotatably supporting said reflector and attached to said platform for permitting said reflector to rotate about one predetermined axis.

3. A stabilizing system as described in claim 2 further comprising: a means for stabilizing at least a portion of said platform.

4. An image stabilizing system as described in claim 3 wherein said reflector stabilizing means comprises:
   a. correcting means including actuator means attached to mechanical ground, and responsive means attached to said reflector in juxtaposition with said actuator means and responsive thereto;
   b. image motion sensing means coupled to the platform for detecting image motion and for generating a signal proportional to such motion; and
   c. control means connected to said image motion sensing means for generating corrective signals for driving said actuator means in response to said signals,
   whereby said actuator means applies a torque to said responsive means causing said reflectors to rotate in a predetermined direction.

5. An image stabilizing system as described in claim 3 further comprising:
   a. a control means,
   b. actuator means, and
   c. target tracking means for generating a target signal for a selected target coupled with said control means and wherein said control means generates corrective signals applied to said actuator means for driving said reflector in a predetermined direction in response to said target signal,
   whereby, said actuator means applies torque to said reflector and causes said reflector to rotate in a predetermined direction to track said target.

6. An image stabilizing system as described in claim 5 wherein there are at least three reflectors each rotatably supported by a mount and positionally related to one another as follows:
   a. a first reflector intercepts an image and reflects the same over a variable angular excursion corresponding to roll relative to said platform,
   b. a second reflector intercepts the image reflected by the first and reflects the same over a variable angular excursion corresponding to pitch relative to said platform, and
   c. a third reflector intercepts the image reflected by the second and reflects the same over a variable angular excursion corresponding to yaw relative to said platform.

7. An image stabilization system as described in claim 5 wherein there are a plurality of platforms, each for supporting at least one reflector.

8. An image stabilization system as described in claim 5 wherein said reflector is supported by said mount such that said reflector is rotatable over a plurality of axes.

9. A tracking system comprising:
   a. a vehicle,
   b. a stabilized inertial platform mounted on said vehicle,
   c. at least one reflector rotatably attached to said platform,
   d. means for rotating said reflector relative to mechanical ground attached to said vehicle in parallel with said platform and reflector combination, and
   e. means for tracking a target and developing a corresponding signal which activates said rotating means.

10. A tracking system as described in claim 9 wherein: said reflector is rotatable about a plurality of axes of rotation.

11. A tracking system as described in claim 10 wherein said rotating means comprises:
    a. actuator means attached to said vehicle.
    b. responsive means for responding to said actuator means attached to said reflector.

12. A tracking system as described in claim 9 wherein said reflector rotating means comprises:
    a. actuator means attached said vehicle, and
    b. responsive means attached to said reflector responsive to said actuator means.

13. A tracking system as described in claim 12 wherein a plurality of independently stabilized platforms support selected elements of the tracking system.

14. A stabilized tracking system for moving a first platform relative to a second platform while maintaining stabilization comprising:
    a. a carrier,
    b. a first platform mounted on said carrier,
    c. means for inertially stabilizing said first platform from said carrier,
    d. a second platform rotatably mounted on said first platform, and
    e. means for rotating said second platform by reference to said carrier.

15. A stabilized system as described in claim 14 wherein said second platform rotating means is connected to the carrier in parallel with said first and second platform combination.

16. A stabilized system as described in claim 15 wherein said first platform stabilizing means comprises:
    a. actuator means attached to said carrier, and
    b. responsive means for responding to said actuator means mounted on said first platform.

17. A stabilized system as described in claim 16 further comprising:
    a. motion detection means for detecting motion of the first platform which generates a reference signal, and
    b. means for actuating said actuator in response to said reference signal.

18. A system as described in claims 2, 3, 4, 5, 6, 7, 8, 14, 15, 16 or 17 wherein said stabilizing means comprises: an isolator attached between a platform and mechanical ground.

19. A system as described in claim 18 wherein said isolator is a soft resilient member.

20. A system as described in claim 18 wherein said stabilizing means further comprises: a flexure member attached in series with said isolator.

21. A system as described in claim 18 wherein said stabilizing means further comprises: a bearing in series with said isolator, said bearing being pivotable about at least one axis.

22. A tracking system as described in claims 9, 10, 11, 12 or 13 wherein said stabilized platform is mounted on an isolator attached between said platform and said vehicle.

23. A system as described in claim 22 wherein said isolator is a soft resilient member.

24. A system as described in claim 22 wherein said stabilizing means further comprises: a flexure member attached in series with said isolator.

25. A system as described in claim 22 wherein said stabilizing means further comprises: a bearing in series with said isolator, said bearing being pivotable about at least one axis.

* * * * *